Oct. 2, 1951

R. F. GAMUNDI 2,570,109

ACTUATING AND PARKING MECHANISM
FOR WINDSHIELD WIPERS

Filed July 7, 1949

INVENTOR.
REYNOLD F. GAMUNDI
BY
McDonald &

ATTORNEYS

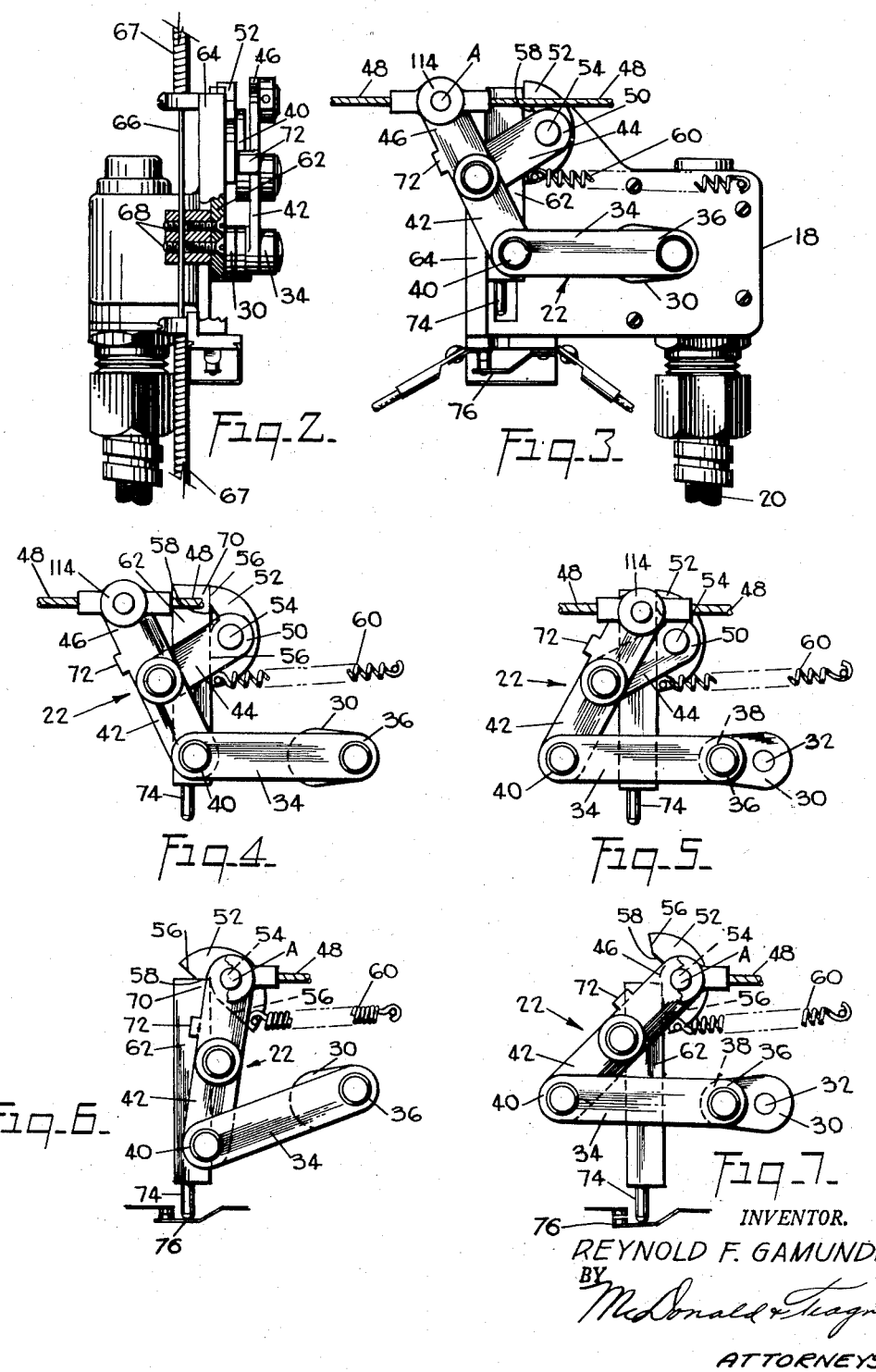

Oct. 2, 1951 R. F. GAMUNDI 2,570,109
ACTUATING AND PARKING MECHANISM
FOR WINDSHIELD WIPERS
Filed July 7, 1949 3 Sheets-Sheet 3

INVENTOR.
REYNOLD F. GAMUNDI
BY
ATTORNEYS

Patented Oct. 2, 1951

2,570,109

UNITED STATES PATENT OFFICE 2,570,109

ACTUATING AND PARKING MECHANISM FOR WINDSHIELD WIPERS

Reynold F. Gamundi, Mayfield Heights, Ohio, assignor to Eaton Manufacturing Co., Cleveland, Ohio, a corporation of Ohio Application July 7, 1949, Serial No. 103,367

10 Claims. (Cl. 74—40)

This invention relates to windshield wiper apparatus and more particularly to actuating and parking mechanism for the wiper blades thereof.

Broadly the invention comprehends the provision of a motion transmitting mechanism incorporated in a vehicle windshield wiper apparatus for converting rotary to oscillating motion and for effectively parking the wiper blades of the apparatus.

Although numerous motion transmitting mechanisms have been devised in connection with windshield wiper apparatus having direct rotary drive providing for the parking of the windshield wiper blades of the apparatus in a predetermined position either at the end of an operating stroke or out of the normal range of operation, none have done so independent of controlling the power drive means. The motion transmitting mechanism herein devised embodies mechanical leverage-linkage permitting of the conversion of rotary motion from a direct power source such as an engine power output shaft or an electric motor or the like to an oscillating motion for the oscillation wiping action of a windshield wiper blade and for the predetermined relative displacement of the leverage-linkage so as to effect a parking of the wiper blades without positively uncoupling the direct power source or inhibiting the continued operation thereof.

An object of the invention is the provision of a simple windshield wiper apparatus actuating and parking mechanism.

Another object of the invention is the provision of a simple motion converting mechanism adapted for use with a windshield wiper apparatus that can be positioned to either convert rotary motion to oscillating motion or not delivery any motion from the output member thereof although the input member is rotated.

A further object of the invention is the provision of a windshield wiper apparatus deriving power for the operation thereof from either a power output of an automotive vehicle engine with which the apparatus is associated or an electric motor, having a motion transmitting mechanism incorporated therein effective to convert the rotary motion of the engine or electric motor to an oscillating motion for the proper operation of windshield wiper blades forming part of the apparatus, said motion transmitting means being manually controllable to move the wiper blades to predetermined parking position without disrupting the power input to the apparatus.

A yet further object of the invention is the provision of a windshield wiper apparatus having a direct rotary power input, comprising a motion converting and transmitting mechanism and windshield wiper blades adapted to be associated with the windshield of a vehicle, driven from the output of the motion converting and transmitting mechanism, said mechanism including a series of interconnected links and levers effective to convert the rotary input motion to an oscillating output motion for the effective oscillation of the windshield wiper blades and a manually operable element for controlling the speed of the rotary power and the operation of the mechanism to effect a parking of the windshield wiper blades when desired without the necessity of disrupting the power delivered to the apparatus.

Other objects and advantages of the invention will appear from the following description taken in connection with the drawings, forming a part of the specification; and in which, Fig. 1 is an isometric view of a windshield wiper apparatus constituting the invention as adapted to a motor vehicle;

Fig. 2 is a side plan partially cross-sectionalized view of a combination gear reduction box and motion converting and transmitting mechanism of the apparatus of Fig. 1;

Fig. 3 is a front plan view of Fig. 2;

Fig. 4 is a front plan view of the motion converting and transmitting mechanism in one position of operation;

Fig. 5 is a front plan view of the motion converting and transmitting mechanism in another position of operation;

Fig. 6 is a front plan view of the motion converting and transmitting mechanism in another different controlled position of operation;

Fig. 7 is a front plan view of the motion converting and transmitting mechanism in a yet further controlled position of operation from that of Figs. 4-6.

Figure 1:
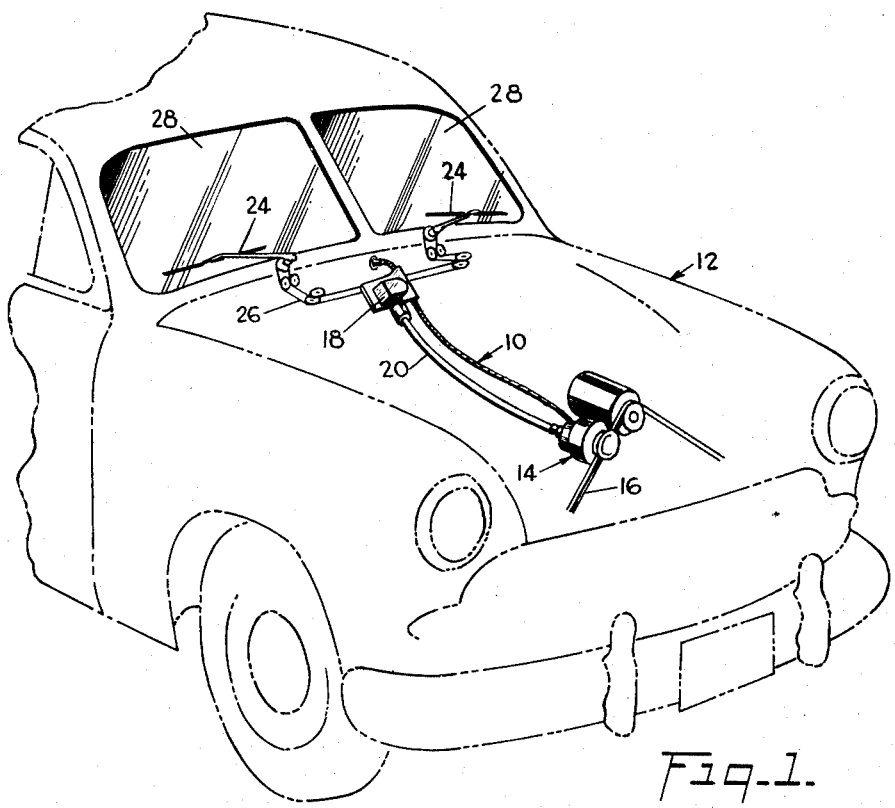

This invention is predicated upon the provision of a windshield wiper apparatus, driven from an electrical motor or from a power take-off of a vehicle engine, having mechanism incorporated therein providing for the effective conversion and transmission of rotary to oscillating motion and wherein the mechanism can be manually controlled to cause a cessation of motion transmission without the requirement of disrupting the power delivery to the mechanism, said mechanism being simple and economical of construction.

The motion conversion and transmission mechanism which can be properly driven from any rotary power output source is herein adapted to a power output of a vehicle engine having a speed governor controlled eddy current electromagnetic power transmitting device as a means of regulating the speed of power delivery to the mechanism. The desired constant speed operation of the mechanism, which in turn oscillates the windshield wiper blades driven from the mechanism at a constant speed, can be achieved by manually adjusting the governor control for the electromagnetic power transmitting device.

The motion conversion and transmission mechanism comprising a series of intermediate links and levers adaptable when adjusted to one particular position of operation to convert and transmit a rotary motion to an oscillatory motion and ineffective when in another adjusted position of operation to transmit any motion from its output connection point although motion is delivered through the series of links and levers from the input rotary source of power. The adjustment causing the cessation of delivery of oscillating motion provides for the movement of the point of connection of output member to coincide with the axis of the arm upon which the output member is normally pivoted such that as motion is delivered to the linkage-leverage system the output member and link therefor oscillate as one member with the output connection point lying on the axis of the link. The link upon which the output member pivots for the oscillation of its output connection is normally held stationary by the manual adjustment means but becomes free for movement upon release motion of the adjustment means, resilient means being provided for coupling the link and output member together as a unit.

The manual adjustment means adapted for controlling the eddy current electromagnetic power transmitting device or like device utilized to modulate the speed operation of the mechanism and for disrupting the transmission of oscillatory motion is also effective after the disruption of oscillatory motion to break the circuit supplying current to the power transmitting device.

The output member of the mechanism to which the windshield wiper blade connection means is fastened provides, upon movement of the output member to joined relation with its pivot arm wherein the output connection point thereof is disposed on the pivot axis of the arm, as predetermined with relation to the windshield wiper blades, a parking position for the blade out of the normal operating range of the blades.

Referring to the drawings for more specific details of the invention 10 represents generally a windshield wiper apparatus as applied to an automotive passenger vehicle 12.

The windshield wiper apparatus comprises a power transmitting device 14 driven from a power output, not shown, of the vehicle 12 by way of belt 16, a gear reduction train, not shown, enclosed in gear box 18 driven from the device 14 by way of flexible shaft 20, a motion conversion and transmission leverage-linkage mechanism 22, and a pair of windshield wiper blade structures 24 driven from the mechanism 22 through a motion transmitting pulley arrangement 26. The windshield wiper blades are adapted to be oscillated across the windshield sections 28 of the vehicle 12.

The motion converting and transmitting mechanism 22 comprises in its entirety a crank arm 30 rotatively driven from the output shaft 32 of the gear reduction train housed in gear box 18, and a link 34, having one end pivotally connected on the free end 38 of the crank arm and its other end 40 to a lever 42, the lever 42 in turn being fulcrumed intermediate its length upon a link 44 with its free end 46 having pivotally secured thereon about axis A wiper blade connection cord 48.

The link 44 which is normally maintained stationary during the conversion of motion from that of rotation at crank arm 30 to an oscillatory motion at the free end 46 of lever 42 is affixed near its end 50 upon a cam member 52 for conjoint movement therewith, as will be hereinafter described.

The cam member 52 and link 44 are adapted to be fulcrumed upon shaft 54 secured to gear box 18 and cam member 52 is provided with a flat cam surface 56 interrupted in its length by a notched portion 58 and is tensioned by a spring 60 extending from a radius arm thereof to a remote fixed point on the gear box.

The flat cam surface 56 is normally fully engaged, as shown in Figs. 3 and 4, by a manually actuated member 62 slideable in a guide way 64 formed on a portion of the gear box, wherein the cam 52 and link 44 are held stationary against the tension load of spring 60 acting to rotate same.

The member 62 is adapted to be manually actuated by a vehicle occupant from a suitable control button, not shown, appropriately and conveniently located in the passenger compartment of the vehicle attached to control wire 66 slideable in conduit 67, said wire being securely coupled to member 62 as shown in Fig. 2 by suitable set screws 68. The member 62 in the course of sliding in guide way 64 is movable as shown by Fig. 4 through 7, to disengage a portion of flat cam surface 56 and thus permit a partial rotation of cam member 52 and link 44 about shaft 54 induced by spring 60 such that the corner 79 of member 62 is received by the notched portion 58 of the cam member. As the cam member 52 and link 44 are rotated, the link 44 acts through the fulcrum point of lever 42 thereon to bring the lever 42 and link into alignment with one another and wherein a finger 72 formed as a part of lever 42 resists the force of spring 60 acting to move the lever and link beyond the point of alignment in one relative direction. With the alignment of the lever and link the axis A pivoted end 48 connection point falls upon the axis of shaft 54, this being possible through the predetermined making of link 44 of a length between its pivot axis on shaft 48 and fulcrum point of lever 42 of equal length to that portion of lever 42 between its fulcrum point on link 44 and axis A connection point.

The member 62 in addition to controlling the adjustment of cam member 52 is provided with an extension 74 movable along the axis of member 62 and therewith to engage and break a switch 76, mounted upon gear box 18, forming a part of the electrical control circuit 78 for the power transmitting device 14, said disruption of the circuit function by the breaking of switch 76 being arranged to occur after the member 62 has moved to release the cam 52 and permit of its partial rotation under the influence of spring 60.

The manually actuated control wire 66 which is coupled to member 62 extends therebeyond for connection with a speed control governor 80 for effecting a speed control of power transmitting device 14, as desired.

Figure 11:
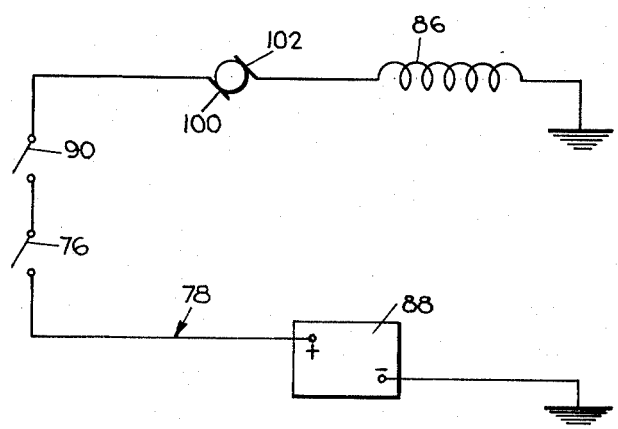
Fig. 11 is a schematic illustration of the electrical control circuit for the eddy current power transmitting device.
Figure 8:
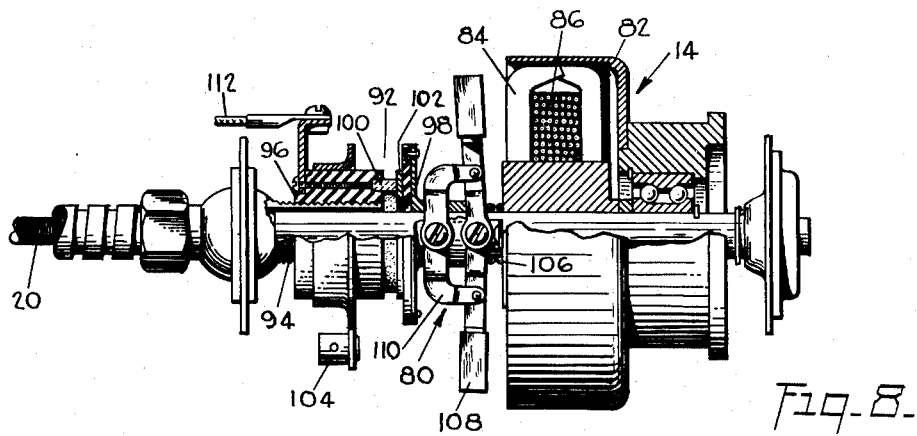
Fig. 8 is a side plan partially cross-sectionalized view of a governor speed controlled eddy current power transmitting mechanism for coupling the input of the windshield wiper apparatus with a power output member of a motor vehicle as shown by Fig. 1.

The power transmitting device 14 as herein employed is of the eddy current electromagnetic type comprising a drum 82 which in this instance is driven by belt 16 from the vehicle engine, and a rotor 84 having an electromagnetic energizing coil 86 secured thereon. The rotor 84 is suitably coupled by way of flexible shaft 20 to the gear reduction train of gear box 18 for imparting rotation thereto as induced between the drum and rotor upon rotation of drum 82 and energization of coil 86. Current is supplied to coil 86 through circuit 78 as shown by Fig. 11 from a battery source of supply 88 controlled as by ignition switch 90 in addition to make and break switch 76 controlled by member 62.

The current is transmitted in circuit 78 to the rotatable coil 86 of device 14 by an electrical brush arrangement 92 associated with speed control governor 80, said brush arrangement comprising a stationary threaded sleeve 94 upon which a sleeve brush holder 96 is threaded for limited axial movement relative to a cooperating sleeve brush holder 98 coupled to governor 80. The brush holders 96 and 98 respectively support annular contacting brush members 100 and 102 effective to transmit current therebetween.

The brush holder 96 is rotatable axially movable along threaded sleeve 94 through the manual actuation of control wire 66 connected thereto through connection 104 effective to cause an axial movement of sleeve brush holder 98 against the resistance of coil spring 106 interposed between sleeve 98 and the hub of rotor 84. The speed governor 80 comprises in addition to sleeve 98, a plurality of weighted arms 108 pivotally supported upon the hub of the rotor for rotation therewith adapted to be thrown out centrifugally under the speed influence operation of the rotor. The arms 108 are loosely pivotally connected intermediate their lengths to the sleeve 98 by links 110 interconnected therebetween such that upon axial movement of the sleeve 98 the weighted arms will be pivoted radially inwardly or outwardly relative to the axis of the rotor for establishing the desired speed control of the rotor and consequently the speed of rotation of flexible shaft 20 coupled thereto.

The brush member 100 is connected into the circuit 78 by lead line 112 and the brush member 102 is connected to the coil by an appropriate lead line, not shown.

Figure 10:
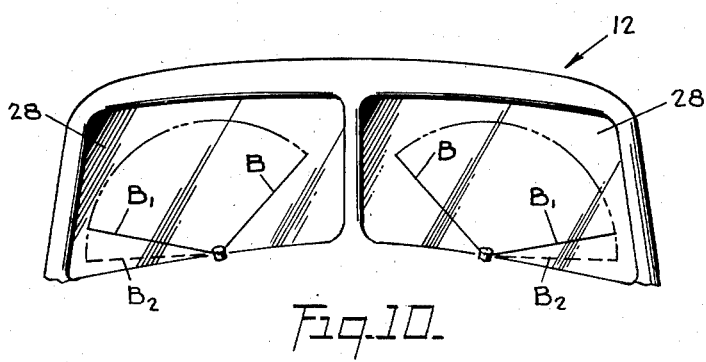
Fig. 10 is a front plan view of the vehicle windshield illustrating a range of windshield wiper blade movement or oscillation and the relative parking position thereof to the operating range.

The crank arm 30 is made of such a length relative to the other links and levers of mechanism 22 as to provide for a predetermined path of oscillating motion of lever 42 such that upon adjustment movement of member 62 to allow for a parking or non-oscillating function of the axis A of lever 42 the axis A thereof is moved to a point beyond its normal range of movement providing for the like movement of cord 48 to park the windshield wiper blades out of their normal range of oscillation, full lines B and B₁ representing in Fig. 10 the end limits of movement of the blades as driven by mechanism 22 and dotted lines B₂ representing the parked position of the blades as affected by the parking position of axis A of lever 42.

In a normal operation of windshield wiper apparatus 10 effective to oscillate the windshield wiper blades across the windshield 28 of the vehicle to clean same the control wire is moved to a position wherein the member 62 bears upon the flat cam surfaces of cam member 52. With the member 62 in the position of Figs. 3 and 4 the extension 74 thereof is out of engagement with switch 76 thus closing the circuit, which through the closing of ignition switch 90 in starting the vehicle engine provides for a flow of current through the circuit 78 by way of brush arrangement 92 to coil 86 for the energization thereof. Assuming the engine has been started and the drum 82 is driven by belt 16 the eddy current electromagnetic action device 14 provides for the transmission of power therethrough to rotor 84 and shaft 20 coupled thereto. The rotation of shaft 20, in turn, is imparted to the gear train of gear box 18 for the reduced speed thereof with output shaft 32 thereof rotating crank 30 at a desirable speed as predetermined by the gear reduction train and the governor setting is established by the manual positioning of the weighted arms 108—through the movement adjustment of control wire 66.

The rotation of shaft 20 is converted and transmitted to an oscillating motion of lever 42 which through connection 114 pivoted upon axis A affords an oscillating actuation of cord 48 attached thereto, the cord 48, in turn, through a series of predeterminedly arranged pulley mountings effecting an oscillating actuation of the windshield wiper blades over the windshield area between lines B and B₁ shown by Fig. 10 of the drawings.

Figure 9:
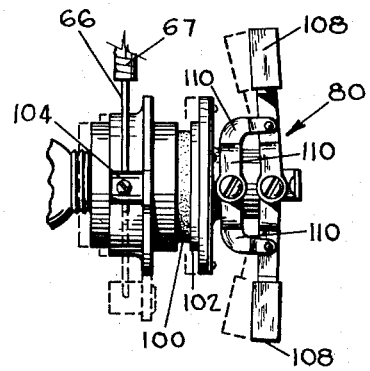
Fig. 9 is a side plan view of the governor control element for the eddy current power transmitting device.

If it is desired to regulate the speed of operation to any given constant speed desired, it is merely necessary to manipulate the control wire 66 to move the weighted arms between the extreme full and dotted line positions of Fig. 9 this adjustment being possible upon rotating the sleeve brush holder 96 through a predetermined angle for the axial movement thereof toward or away from the weighted arm pivots upon the rotor hub.

When it is desired to park the windshield wiper blades at position B₂ shown by Fig. 10, the member 62 is advanced to the position of Fig. 6 wherein the spring 60 acts to rotate the cam member 52 and link 44 an amount bringing lever 42 into alignment with link 44 wherein the link is held from overrunning the lever 42 in one direction by finger 72 abutting the side of link 44. Thereafter movement of the cam member 52, link 44 and lever 42 occurs as a unit with the axis A connection point of lever 42 coinciding with the axis of shaft 54. With the axis A of lever 42 lying on the axis of shaft 54, no motion is transmitted at this time to connection 114 and cord 48 even though the crank arm 30 is continued in rotation and the link 34, lever 42, link 44 and cam member are moved thereby. Fig. 7 illustrates the fact that upon further movement of the member 62 beyond the position shown by Fig. 6, the extension 74 engages the switch 76 and causes a breaking of the circuit 78 by disengaging the current transmitting contactors of the switch. Simultaneously, therewith it is to be noted that although the leverage-linkage arrangement of mechanism 22 in Fig. 7 is in a different phase of operation from that of Fig. 7, the axis A of lever 42 and axis of shaft 54 remain fixed.

It is to be recognized that the mechanism 22 and electrical circuit control associated therewith can be adapted to any power drive means for properly actuating the input to the mechanism 22 and is, therefore, not to be limited to the eddy current electromagnetic power transmitting means herein specifically disclosed.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. Mechanism for operating a member requiring oscillatory motion comprising a rotary power output means, a motion transmitting and converting means driven thereby comprising a series of interconnecting links and levers for normally delivering an oscillating motion at the output therefrom, a member pivotally connected to an output lever of the motion transmitting and converting means adapted to be actuated thereby with oscillating motion, said lever having a fixed reaction point for the normal operative transmission of oscillation to the member, resilient means acting on the output lever, manually actuated means engageable with the resilient means normally resisting the load of the resilient means, effective upon the movement thereof to remove resistance to the resilient means and to permit the resilient means to act on the output lever to alter the reaction point of the output lever and means engageable with the output lever for fixedly positioning the pivot point of connection between the output lever and the member for effectively inhibiting the transmission of any oscillatory motion from the output lever to the member during the input of rotary motion to the motion transmitting and converting means.

2. Mechanism for operating a member requiring oscillatory motion comprising a rotary power output means, a motion transmitting and converting means driven thereby comprising a series of interconnecting links and levers for normally delivering an oscillating motion at the output therefrom, a member connected to an output lever of the motion transmitting and converting means adapted to be actuated thereby with oscillating motion, means supporting the output lever upon a fixed reaction point, and a manually actuated control engageable with the supporting means to provide for the displacement of the fixed reaction point of the output lever from its normal operating position so as to disrupt the transmission of motion at the output connection of the lever to the member operated thereby and engageable with the rotary power output means after the disruption of motion transmission from the output of the motion transmitting and converting means for disrupting the power output thereof.

3. Mechanism for operating a member requiring oscillatory motion comprising a rotary power output means, a motion transmitting and converting means driven thereby for normally delivering an oscillating motion at the output therefrom, a member connected to an output element of the motion transmitting and converting means actuated thereby with oscillating motion, means supporting the output element upon a fixed reaction point, and a manually actuated control engageable with the supporting means to provide for the displacement of the fixed reaction point of the output element from its normal operating position so as to disrupt the transmission of motion at the output connection of the element to the member operated thereby, and engageable with the rotary power output means to regulate the speed output thereof and to disrupt the power output therefrom subsequent to the disruption of the output of motion transmission from the motion transmitting and converting means.

4. Mechanism for operating a member with a desired oscillatory motion and for arresting the motion of same out of its normal range of motion comprising a rotary power transmitting means, a motion transmitting and converting means driven from the rotary power means normally-delivering an oscillatory motion at an output point therefrom, a member driven from an output element of the motion transmitting and converting means with oscillatory motion over a predetermined path of movement, spring loaded means normally establishing a fixed reaction point for the element, and a manually actuated control engageable with the spring loaded means providing for the displacement of the fixed reaction point of the element from its normal operating position effective to disrupt the transmission of motion from its output connection with the member and park the output connection point beyond its range of normal oscillation so as to move the member driven thereby to a position beyond its predetermined path of movement at one end thereof, said control also cooperating with the rotary power transmitting means to regulate the output speed thereof and to entirely disrupt the operation thereof.

5. Windshield wiper mechanism comprising a rotary power output means, means driven therefrom for transmitting and converting the motion thereof from rotation to oscillation, an oscillatory windshield wiper element, means interconnecting the wiper element and an output element of the motion converting means for transmitting oscillatory motion from the motion converting means to the wiper element, spring loaded means associated with the output element for establishing a reaction point therefor, and manually actuated control means cooperable with the spring loaded means providing for the disruption of motion transmission from the output connection of the output element with the wiper element and cooperable with the power output means for regulating the speed of operation thereof and for disrupting the output of power therefrom subsequent to the disruption of motion transmission from the output connection of the output element.

6. Windshield wiper mechanism comprising a rotary power output means, speed output control means therefor, a motion transmitting and converting means driven from the power output means comprising a series of interconnected links and levers effective to transmit the rotary motion delivered thereto and converted at the output thereof into oscillatory motion, spring means tensioning the output member of the motion transmitting and converting means adapted to move it from its normal phase of operation, a windshield wiper element connected to the output member of the motion transmitting and converting means operable with oscillatory motion, and manually actuated means normally resisting the load of the spring permitting of the oscillatory output of the motion transmitting and converting means, said manually actuated means upon the predetermined movement thereof effective to remove resistance to the spring and permit of the movement of the output of the motion transmitting and converting means under the action of the spring to a position beyond the normal oscillatory range of motion thereof disrupting motion transmitted therefrom, said manual means also being cooperable with the speed output control for the rotary output means for adjusting same as desired and with the power supply to the rotary power output means to disrupt the operation of same.

7. Windshield wiper mechanism for an engine driven vehicle comprising a rotary electromagnetic power transmitting device driven from an output of the vehicle comprising cooperable input and output members, an electrical current supply for the device, a speed control governor for the output member of the device, a switch controlling the current supply to the device, a motion transmitting and converting means driven from the output of the device comprising a series of interconnected link and lever members, the input of which is rotated and the output of which is oscillated, the output member being pivoted intermediate its length and having interconnection with the link and lever members at one end, a link member pivotally interconnected to the intermediate pivot point of the output member and itself pivoted upon a fixed axis, spring means tensioning the link member for rotation in one direction, a windshield wiper element having connection with the free end of the output member of the link and lever members, and a manually actuated control means engageable with the link and lever members, the speed control governor and switch normally, during the oscillation movement of the wiper element as actuated by the output of the motion transmitting and converting means, holding the link member from rotation against the resistance of the spring, said control means upon the movement thereof effective to consecutively change the governor control setting for desired speed output of the output member of the device, release the link member permitting of the partial rotation thereof and the disruption of motion transmission at the output member's connection with the windshield wiper element, and the breaking of the switch connection disrupting current supply to the device resulting in the cessation of power output therefrom.

8. A motion transmitting and converting mechanism comprising a series of interconnected links and lever members, the input one of which is rotated and the output one oscillated, the output member being interconnected at one end to the series of links and levers, a link member pivoted at one end upon a fixed axis and pivotally secured at its other end intermediate the length of the output member, the free end of the output member having a pivoted connection thereon, spring means tensioning the link member for rotation in one direction and means engageable with the link member normally resisting the rotation thereof as induced by the spring means, said last mentioned means operable upon the actuation thereof to release the link for rotation.

9. Mechanism for transmitting and converting motion from a rotary input source to oscillation at its output connection comprising a series of interconnected links and levers, the input lever member of which is rotated and the output lever member of which is normally oscillated over a predetermined range, a link member pivoted upon a fixed axis having its other end pivotally connected to the output lever member intermediate its length, said output lever member having one end interconnected in the series of links and levers and its other end pivotally connected to a member to be oscillated thereby, the length of the link member between its pivot points being equal to the length of the output lever member between its pivoted connection intermediate its length and the pivoted connection at its one end with the member to be oscillated, spring means urging the link member for rotation in one direction, and manually actuated means engageable with the link member in one position to hold it stationary against the resistance of the spring permitting upon rotation of the input member the oscillation of the output member and the member pivotally connected thereto and in another position to release the link member from rotation and provide for disruption of the transmission of oscillation from the output connection of the output member with the member to be oscillated thereby.

10. Mechanism for transmitting and converting a rotary motion to an oscillatory motion and for parking a member to be oscillated beyond its normal path of oscillation comprising a series of interconnected link and lever members, the input lever member of which is rotated and the output lever member of which is oscillated, said output lever member being interconnected in the series of link and lever members at one end and to a member to be oscillated at its other end and pivoted intermediate its length, a link member to which the lever member is pivoted being pivoted upon a fixed axis, spring means tending to rotate the link member in one direction about its fixed axis, said link member between pivots being of equal length to the output lever member between its intermediate pivot and its pivoted connection with the member to be oscillated, means engageable with the link member when in one position to hold the link member stationary, providing for the predetermined oscillatory movement of the member connected to the output lever member as rotation is induced in the input lever member, and when in another position providing for the release thereof permitting of the relative rotation of the link member and the output lever member as induced by the spring means bringing the fixed axis of the link member and the axis connection of the output lever member with the member to be oscillated into coaxial alignment and means cooperable between the link member and output lever member holding the said axes in alignment such that no oscillatory motion is transmitted from the output member at its pivotal connection with the member to be oscillated thereby.

REYNOLD F. GAMUNDI.

REFERENCES CITED

The following references are of record in the file of this patent:

UNITED STATES PATENTS

| Number | Name | Date |
|---|---|---|
| 2,031,830 | Hansmann | Feb. 26, 1936 |
| 2,079,573 | Lauer | May 4, 1937 |
| 2,119,510 | Horton et al. | June 7, 1938 |
| 2,447,130 | Matulartis et al. | Aug. 17, 1948 |